Nov. 10, 1970 R. C. SWENGEL, SR., ETAL 3,539,762
WELDED CONNECTION METHOD AND MEANS
Filed April 12, 1968 2 Sheets-Sheet 1

INVENTORS
ROBERT CHARLES SWENGEL SR.
EMERSON MARSHALL REYNER, II
J. A. CRUMLEY
BY John R. Hopkins

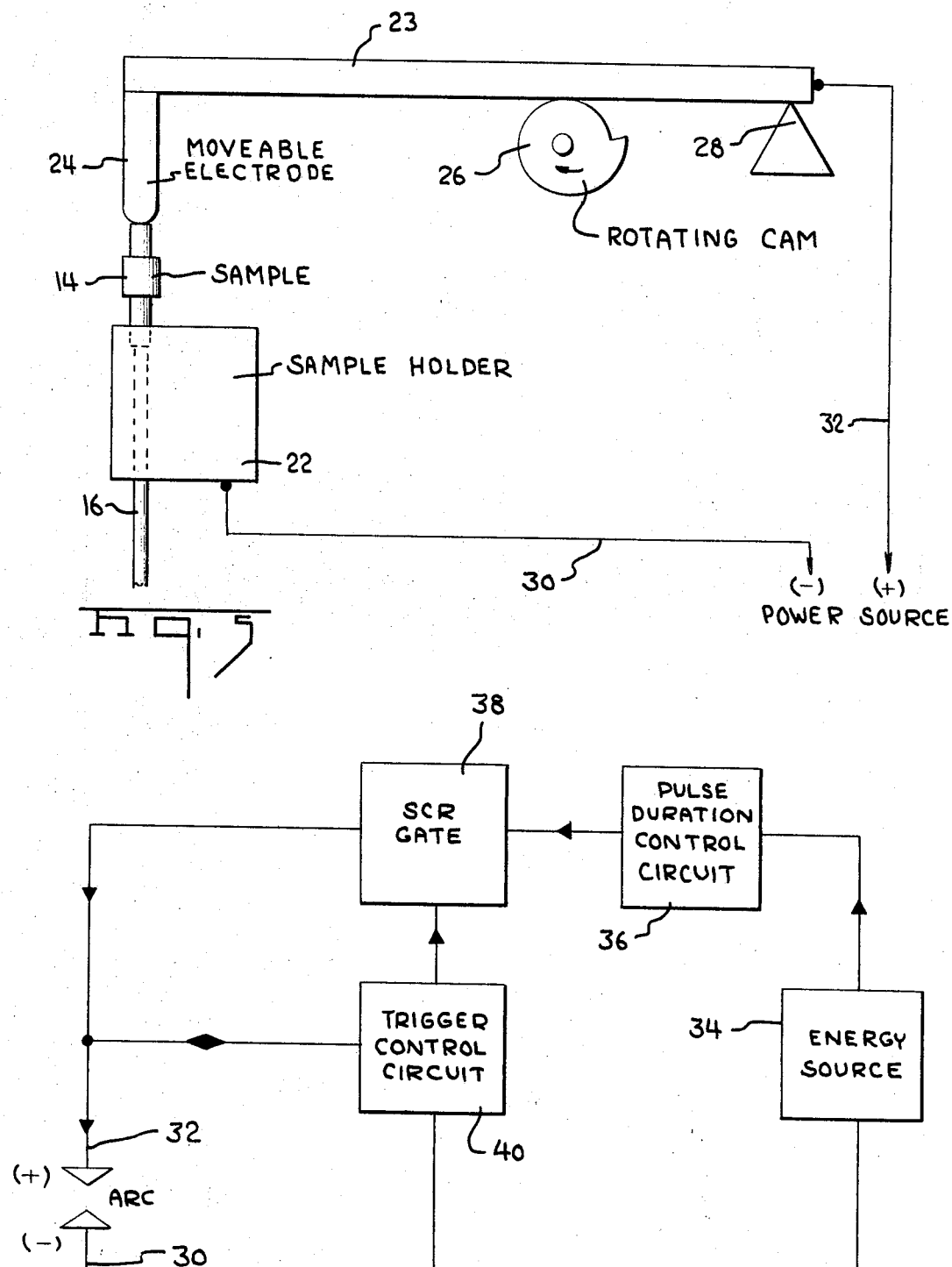

United States Patent Office 3,539,762
Patented Nov. 10, 1970

3,539,762
WELDED CONNECTION METHOD AND MEANS
Robert Charles Swengel, Sr., Hellam, Emerson Marshall Reyner II, Harrisburg, and J. A. Crumley, Mechanicsburg, Pa., assignors to AMP Incorporated, Harrisburg, Pa.
Continuation-in-part of application Ser. No. 433,350, Feb. 17, 1963. This application Apr. 12, 1968, Ser. No. 720,776
Int. Cl. B23k 9/00
U.S. Cl. 219—127                    6 Claims

ABSTRACT OF THE DISCLOSURE

A method and means is disclosed for welding metal of copper-to-copper or aluminum-to-aluminum systems to provide an electrical connection. The welding method is based upon fusion of the material of workpiece elements by an arc drawn between an anodic welding electrode and cathodic workpiece elements through the discharge of a capacitor. The weld is made with the electrode in motion and the rate of electrode withdrawal is controlled. A small quantity of aluminum is introduced into the melt of material of the workpiece elements for the copper-to-copper system by incorporating a small ring of aluminum into the end of one of the elements. In both material systems optimum parameters of applied power and rate of electrode withdrawal are reported.

---

This application is a continuation-in-part of U.S. application S.N. 433,350 filed Feb. 17, 1963, in the name of R. C. Swengel.

BACKGROUND OF THE INVENTION

A considerable effort has been made over the years to provide a practical and effective welding of electrical conductors in various configurations of wires, terminals, connectors and the like. The conductor material most often employed is copper or some copper alloy with the conductor material in second place in terms of use being aluminum or some aluminum alloy. Prior art efforts to join conductors of these materials has been only moderately successful in terms of application on a production basis. Shortcomings of the prior art include the need for complicated and expensive welding equipment requiring, with many approaches, a supply of protective gas injected to surround a weld site during welding. Many techniques produce welds of widely varying characteristics including generally low mechanical strength as well as an electrical resistance which varies substantially from weld to weld. Ohter techniques require a separate and expensive consumable electrode.

In U.S. application Serial No. 433,350, filed Feb. 17, 1965, in the name of R. C. Swengel, a method and means for welding is disclosed which eliminates much of the complexity found in other welding techniques. For example, it eliminates the need for a protective atmosphere in the form of a special gas or the like and it does so with an extremely simple and reliable welding circuit. The technique of the Swengel application contemplates moving a welding electrode into engagement with fixed workpiece elements and then away from such elements, with an arc being initiated and struck between the electrode and workpiece elements by a trigger developed when contact is broken therebetween. The arc developed as the electrode is moved away from the workpiece elements causes the elements to melt and provide a fusion weld between such elements. One of the main advantages of the technique of this earlier application is that it allows an operator to precisely place the electrode in a desired position without concern for accidentally and permanently striking an arc upon contact. Because the arc is struck as the electrode moves away from the workpiece there is little criticality as to the shape of the electrode or the workpiece elements in regard to having pointed surfaces. While experience with the type of circuit of the aforementioned pending application has revealed that it works adequately to solve a number of technical problems in welding, such experience has shown the need for further development in regard to providing welded connections defined by either a copper-to-copper or aluminum-to-aluminum material system.

SUMMARY OF THE INVENTION

The present invention relates to a method and means for welding electrical conductors to form an electrical and mechanical union therebetween and particularly to a method and means for use with electrical conductors in either a copper-to-copper or aluminum-to-aluminum material system.

It is an object of the present invention to join electrical conductors in a weld of improved quality in terms of electrical resistance and mechanical strength. It is a further object to provide a method and means for welding electrical conductors of copper or copper-based materials, or aluminum or aluminum-based materials in various forms and configurations having a utility for interconnecting electrical circuit paths. It is still a further object to provide a method and means for welding a copper or copper-based alloy wire to a copper or copper-based alloy electrical terminal. It is another object to provide a method and means for welding an aluminum or aluminum-based alloy wire to an aluminum or an aluminum-based alloy material in the form of an electrical terminal.

The foregoing objects are attained by the present invention through the use of a welding technique and circuit which involves moving an anodic welding electrode into engagement with metal elements of a cathodic workpiece and then withdrawing such electrode at a controlled rate and striking an arc therebetween as relative movement apart takes place. In a copper-to-copper conductor system a small quantity of aluminum is introduced into the melt of the workpiece elements. In a preferred embodiment the introduction of aluminum into the melt is achieved by an aluminum ring placed in a recess in one of the elements in the area of weld. In the aluminum-to-aluminum conductor material weld there is an additional control of current to preclude ignition of the welded material. Both systems utilize the workpiece elements as cathodes relative to the welding circuit.

In the drawings:

FIG. 5 is a schematic view of an apparatus for providing movement between an electrode and a sample workpiece; and FIG. 6 is a schematic view of a control circuit used to provide welding energy.

DESCRIPTION OF PREFERRED EMBODIMENT

Figure 1:
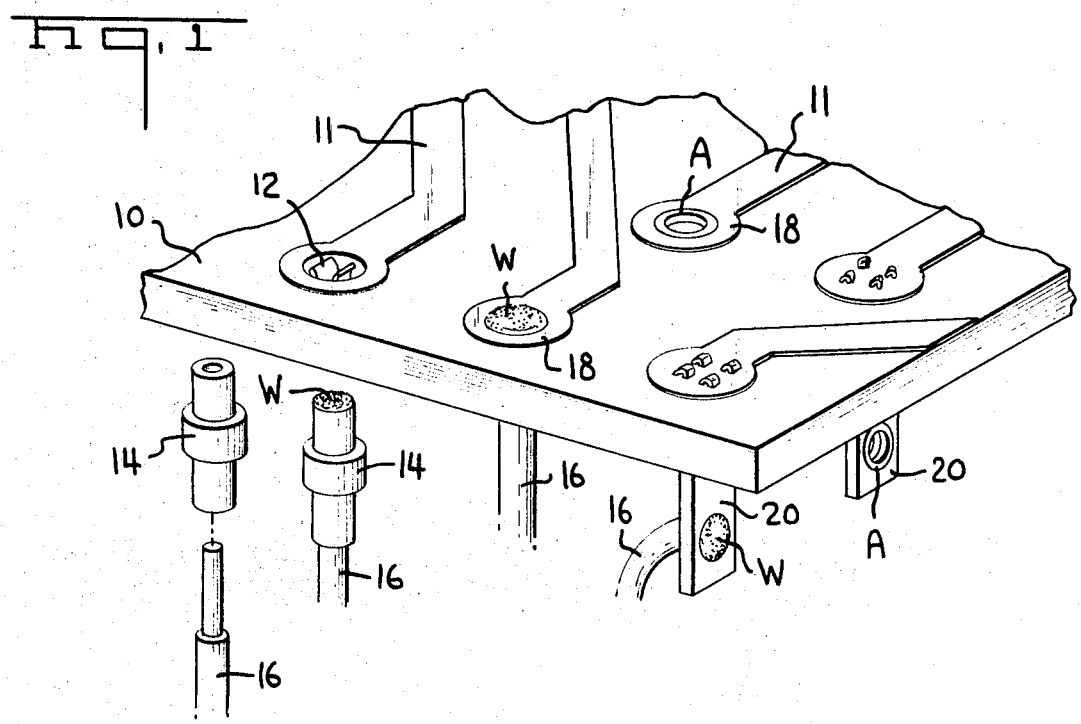
FIG. 1 is a perspective view of welded terminations in three different geometries included to illustrate invention utility.

Before turning to the details of the present invention reference is made to FIG. 1, depicting a number of different kinds of electrical terminations or connections. In FIG. 1 numeral 10 represents an insulating panel or board member which serves as a housing for electrical terminal devices. Member 10 may include a number of conductive paths 11 thereon in the form of deposited conductive material or foil or the like. Member 10 may also include electrical and/or electronic components interconnected into a circuit.

To the left of the member 10 shown in FIG. 1 is a spring contact terminal receptacle 12, staked to the member 10 within an aperture therein. The element 12 is terminated on one side to a conductive path 11 and the other side is open to receive a terminal pin 14 attached to a conductive lead 16. The pin 14 is welded as at W to the conductive portion of the lead 16 and may be plugged into the receptacle 12 to serve as an input or output connection to the board member. A pin 14 is also shown in FIG. 1 prior to being welded.

In the center of member 10, as shown in FIG. 1, is a further termination of a lead 16 made by having the conductive portion of the lead fitted through an aperture in the member 10 into a cylindrical metal member 18 permanently attached to the panel member 10 and joined to a conductive path 11. The conductive portion of the lead is positioned flush with the upper surface of member 18 and terminated thereto as by a weld W. A member 18 is also shown prior to termination.

To the right in the panel 10, as shown in FIG. 1 is a terminal post 20 mechanically staked through an aperture in the member 10 and connected to a conductive path 11. The free end of 20 includes a hole therein with the conductive portion of the lead 16 inserted therein and with a weld W terminating the lead to the post. A post 20 is shown prior to welding to the upper right in FIG. 1.

Figure 2:
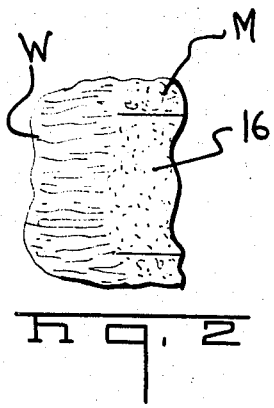
FIG. 2 is an enlarged and sectioned view showing a welded termination.

FIG. 2 shows in section a weld W of each of the foregoing terminations, considerably enlarged. The conductive portion of the lead 16 is enumerated, as is the weld W. The portion of material surrounding the lead 16 is denominated M and may be taken to be a portion of the barrel of the pin 14, or a portion of the metal sleeve 18, or a portion of the post 20.

Figure 3:
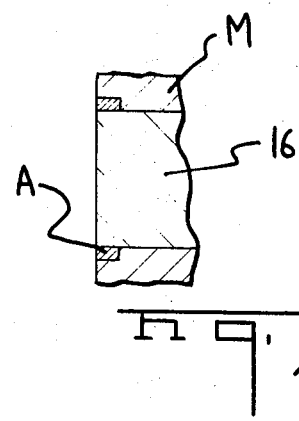
FIG. 3 is a view similar to FIG. 2, but prior to welding which depicts an illustrative embodiment for a copper-to-copper conductive material system.

FIG. 3 shows a preferred configuration of a metal member M defining 14, 18 or 20 in a condition prior to welding. As can be discerned, a small recess is provided in M fitted with a ring shown as A in FIGS. 1 and 3. In a preferred embodiment for a copper-to-copper system the ring A is aluminum. As will be detailed hereinafter, the disposition of aluminum shown in FIG. 3 results in an introduction of the aluminum into the melt resulting when an arc is drawn between the workpiece elements and a welding electrode brought to bear against the end surfaces thereof.

Figure 4:
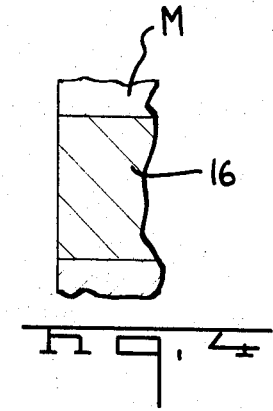
FIG. 4 is a view similar to FIG. 2, but prior to welding which depicts an embodiment for an aluminum-to-aluminum conductive material system.

FIG. 4 shows a preferred configuration for an aluminum-to-aluminum conductive material system. The surrounding member M which may be 14, 18 or 20 is thus of aluminum and the wire 16 is of aluminum.

Referring now to FIG. 5, a terminal pin 14 is shown relative to an apparatus for effecting a welding of a wire 16 to the pin material. The terminal is mounted in a sample holder 22 which may be considered as fixed relative to an arm 23, carrying on one end thereof a movable electrode shown as 24. Arm 23 is supported on a rotating cam 26 which drives the arm up and down or toward and away from the sample holder 22. Arm 23 is hinged as at 28 and may be considered to be biased downwardly. As cam 26 is rotated electrode 24 is brought first into contact with 14 and then away at a rate determined by the rotation of 26. The sample holder is connected to a negative power supply lead 30 and the arm 23 and thus electrode 24 is connected to a positive power supply lead 32.

The mechanism shown in FIG. 5, while fully operable, is included to schematically illustrate a welding technique. In the aforementioned application to R. C. Swengel, a solenoid type drive for the movable electrode is disclosed which may be preferable for production use. FIG. 6 shows schematically a triggering and power supply circuit useful with the apparatus of FIG. 5. The leads 30 and 32 referenced in FIG. 5, may be seen in FIG. 6. Power for supplying the welding arc is derived from an energy source shown as 34, which may include a capacitor and a D.C. voltage supply connected to charge such capacitor. A pulse duration control circuit 36 is connected to the output of the capacitor 34 and to the input of an SCR gate 38. The pulse duration control circuit may be any suitable device capable of regulating the length of time of discharge of the capacitor in 34. The circuit 36 may, for example, be a simple monostable flip-flop connected to close a relay for a controlled period of time with the relay being operable to connect the capacitor to gate 38. Gate 38 is connected to the supply through circuit 36 and to the welding electrode through lead 32. The gate electrode of the SCR is connected to a trigger control unit 40 which is in turn connected across the leads 30 and 32. The trigger control circuit 40 may be any suitable device capable of sensing circuit closure between leads 30 and 32, as effected by closure of the movable electrode against a workpiece. The unit 40 may, for example, be a core having a winding thereon connected to a battery or the like and operable upon closure of 30 and 32 to develop current flow building up a field in the core. When the circuit path of 30 and 32 is broken by movement of the movable electrode away from the workpiece, collapse of the field can be made to generate a trigger turning on the SCR of gate 38. Once the SCR gate is on it will remain on until the end of the pulse duration as controlled by the circuit 36. In the aforementioned application to R. C. Swengel, the circuit there disclosed did not include a pulse duration control circuit and such is not altogether necessary for many applications of the invention technique. It may, however, be preferred for experimental work and for apparatus having a general utility in welding workpieces of different configurations and different materials.

With the foregoing technique and apparatus in mind, reference will now be made to its use as applied to welded terminations. In general a weld serves to provide a mechanical joining together of two or more elements which will withstand a predetermined loading. The mechanical strength of a termination is usually related to the breaking strength of the weaker of the terminated members. For example, in a termination of a wire conductor to a terminal in the configurations shown in FIG. 1, quality of termination is related to the breaking strength of wire 16. A termination where the wire breaks at some point well away from the interface of workpiece elements is mechanically superior. A termination where a tensional loading produces a break at the point of termination or in the weld W is less than superior, but possibly quite adequate for particular loads encountered in certain uses of the apparatus or device. With regard to electrical terminations, a second basic criteria is one of electrical resistance. A termination providing an interface having a resistance equal to or at least approaching that of the element having the higher resistance is superior. In power circuits, terminations of higher resistance are generally more acceptable than in signalling circuits. In general, a given electrical termination should affect the circuit in which it is used as little as possible.

Referring back to the terminal structure revealed in FIGS. 1–3, the technique heretofore described was utilized to provide terminations between workpiece elements of copper in what might be termed a copper-to-copper conductive material system. It has been discovered that the addition of aluminum into the melt between copper workpieces very substantially increases the tensile strength of the sample by eliminating voids within the weld bead. The amount of aluminum introduced in the melt is not altogether critical, a small amount being found to work well. Excellent results are found when the aluminum utilized is slightly less than one percent by weight of the total melt of the workpiece elements. The mechanism by which aluminum eliminates voids and produces a quality weld is not altogether understood. It has been suggested that the aluminum acts as an oxygen getter, an arc modifier, as a heat sink by boiling at a lower temperature than copper. The function of the aluminum may be any one or a combination of these or other things.

In an actual sample a copper sleeve approximately one-half of an inch in length was utilized to terminate No. 14AWG solid copper wire having a diameter to fit snugly within the sleeve and with the end of the wire and with the end of the sleeve made flush, as shown in FIG. 3. In the foregoing sample a No. 1100 alloy of aluminum, which is relatively pure, approximately 0.010 of an inch in length and 0.0035 of an inch in thickness with an inner diameter of 0.064 of an inch was employed in a copper sleeve having an inner diameter of 0.064 of an inch and a thickness of 0.016 of an inch.

In working with a copper-to-copper system it was found that the polarity shown in FIGS. 5 and 6 eliminated to a large extent the forming of soot on the sample caused by anode flare; a jet of ionized gas and metal vapor which shoots out from the anode. By using a tungsten anode as the welding electrode a clean weld was observed to result. Since the aluminum is contained in the sample, which is made to be the cathode, a fresh surface is available for each operation and problems with cathode variations are minimized. Experimentation with the foregoing sample and the application of FIGS. 5 and 6 revealed optimum welding parameters which were as follows:

Capacitor voltage—72 volts
Pull speed—1.5 inches per second
Pulse duration—20 milliseconds
Series resistance—90 milliohms
Total capacitance—0.11 farad
Peak current—675 amperes Use of the foregoing parameters provided a tensile result of 110 pounds before breakage of a terminated wire effected by pulling on such wire and holding the sleeve to which it is welded. The No. 14AWG EDP copper wire had a tensile rating of 125 pounds in its normal condition. When annealed prior to welding this same wire had a tensile rating of 115 pounds.

It was found that weld made in a shorter time than listed in the foregoing schedule resulted in a higher tensile strength because of a reduced annealing in the wire caused by welding. In making welds in a shorter time, however, care should be exercised so that the higher power required to melt the weld more quickly does not operate to blow the melt off the sample. The foregoing parameters can be varied relative to each other. For example, over a limited range, an increase in voltage and therefore energy, can be compensated by an increase in resistance, a decrease in capacitance, an increase in pull speed, or a decrease in pulse duration, all of which serves to decrease the energy applied to melt the workpiece elements. Acceptable welds were produced with a variation in pull speed from 1.2 to 2.0 inches per second. A variation in pulse duration from 15 to 25 milliseconds was also found to be acceptable. The main limitation upon the resistance is that it not be made so high that the capacitance is not allowed to discharge before the pulse duration control terminates the arc or so low that the peak current explodes or vaporizes the melt.

Turning now to the aluminum-to-aluminum system, samples of the same configuration as previously defined, except without an aluminum ring, were made utilizing the configuration of FIG. 4. The following were found to be optimum parameters for an aluminum-to-aluminum system:

Capacitor voltage—60 volts
Pull speed—2.0 inches per second
Pulse duration—20 milliseconds
Series resistance—90 milliohms
Total capacitance—0.044 farad
Peak current—450 amperes The foregoing optimum parameters provided a tensile result of 28 pounds on a sample using a wire of an annealed breaking strength of 45 pounds and a hardened breaking strength of 96 pounds. This relatively low tensile strength does not preclude utility of an aluminum-to-aluminum system. Many applications can be served by a tensile rating on the order of 15 pounds. Furthermore, there is some indication that industry may turn to aluminum wire which is only ten percent above a fully annealed condition which means that the invention would provide a welded termination exceeding fifty percent of wire strength.

The foregoing parameters for an aluminum-to-aluminum system can also be varied somewhat. The main limitation seems to be that peak current of the weld pulse is limited to avoid ignition of the aluminum melt. Peak current was found to be limited to approximately 500 amperes in the configuration of the foregoing sample. A substantial reduction in pulse duration to as little as five milliseconds was found operable, but was not found to prevent annealing.

One advantage of the present invention as related to an aluminum-to-aluminum system is that it permits a low resistance weld to be made in air which is adequate for many applications. It is contemplated that in certain configurations some additional holding means may be provided to increase the tensile rating of the termination of aluminum wire. For example, it is contemplated that a weld in the configuration previously described may be provided to assure a stable, low resistance path, with a portion of the sleeve apart from the weld site being crimped or clamped in a suitable fashion to grip the wire at a point apart from the portions annealed by the welding operation. The advantage of the invention weld for an aluminum-to-aluminum system can be appreciated from a test performed on aluminum-to-aluminum welds subjected to four percent salt fog and periodic exposure to ultraviolet light. Welds provided by the present invention showed no appreviable change after 21 days exposure to the foregoing environment.

Having now disclosed the invention in terms intended to enable a prefered practice thereof in its various modes, claims are appended which are intended to define what is believed to be inventive.

We claim:

1. In a method of welding copper-to-copper, the steps comprising positioning members to be welded together with end surfaces thereof substantially adjacent, positioning an element of aluminum proximate said surfaces and drawing an arc so as to melt the said members and element and introduce the aluminum into such melt.

2. The method of claim 1 wherein said step of positioning said aluminum element includes a disposition of aluminum down within the body of at least one of said members with a surface of the aluminum element proximate the end surface of such member.

3. The method of claim 1 wherein the said step of positioning an aluminum element includes a disposition of a ring of aluminum coaxial to said members.

4. The method of claim 1 wherein one of said members is made to include an annular recess in the end surface thereof and the aluminum element is disposed in said recess.

5. The method of claim 1 wherein the amount of aluminum is limited to approximately one percent by weight of the melt resulting from the arc.

6. A method of welding pieces of copper based metal together comprising the steps of positioning said pieces with end surfaces adjacent, positioning an aluminum element proximate said surfaces, displacing a welding electrode to contact at least one of said surfaces and drawing an arc between said electrode and said pieces to melt said pieces and said aluminum, thereby welding said pieces together.

References Cited

UNITED STATES PATENTS

| | | | |
|---|---|---|---|
| 1,869,667 | 8/1932 | Churchward | 219—118 |
| 2,462,882 | 3/1949 | Martin | 219—99 |
| 2,683,791 | 7/1954 | Ruehlemann et al. | 219—130 |
| 2,761,955 | 9/1956 | Sholle | 219—127 |
| 3,268,247 | 8/1966 | Murphee | 219—118 X |

JOSEPH V. TRUHE, Primary Examiner

L. A. SCHUTZMAN, Assistant Examiner

U.S. Cl. X.R.

219—118